United States Patent
Elias (10) Patent No.: US 11,035,705 B2
(45) Date of Patent: Jun. 15, 2021

(54) DEVICE AND METHOD FOR MEASURING A GAS FLOW SPEED

(71) Applicant: OFFICE NATIONAL D'ETUDES ET DE RECHERCHES AÉROSPATIALES, Palaiseau (FR)

(72) Inventor: Paul-Quentin Elias, Paris (FR)

(73) Assignee: OFFICE NATIONAL D'ETUDES ET DE RECHERCHES AÉROSPATIALES, Palaiseau (FR)

(*) Notice: Subject to any disclaimer, the term of this patent is extended or adjusted under 35 U.S.C. 154(b) by 204 days.

(21) Appl. No.: 16/467,938

(22) PCT Filed: Dec. 1, 2017

(86) PCT No.: PCT/FR2017/053343
§ 371 (c)(1),
(2) Date: Jun. 7, 2019

(87) PCT Pub. No.: WO2018/104627
PCT Pub. Date: Jun. 14, 2018

(65) Prior Publication Data
US 2019/0346298 A1     Nov. 14, 2019

(30) Foreign Application Priority Data
Dec. 8, 2016   (FR) ...................... 16 62169

(51) Int. Cl.
*G01F 1/56* (2006.01)
*G01P 5/08* (2006.01)

(52) U.S. Cl.
CPC . *G01F 1/56* (2013.01); *G01P 5/08* (2013.01)

(58) Field of Classification Search
None
See application file for complete search history.

(56) References Cited

U.S. PATENT DOCUMENTS

| 3,945,251 A | 3/1976 | Pierce |
| 4,127,029 A | 11/1978 | Murtin |
| 4,448,082 A | 5/1984 | Bariol et al. |

(Continued)

FOREIGN PATENT DOCUMENTS

| EP | 0 050 998 A1 | 5/1982 |
| FR | 2 389 103 A1 | 11/1978 |

OTHER PUBLICATIONS

International Search Report, dated Jan. 31, 2018, from corresponding international application No. PCT/FR2017/053343.

(Continued)

*Primary Examiner* — Harshad R Patel
(74) *Attorney, Agent, or Firm* — Nixon & Vanderhye (57) ABSTRACT

Disclosed is a device for measurement of a flow speed of a gas comprises a probe, a voltage supply source and a pulse-counting detection circuit. The probe comprises an axial electrode whose exposed end has a small radius of curvature, and a peripheral electrode. The supply source applies an alternating voltage between both electrodes, and electrical discharges which are produced through the gas between the two electrodes are detected and counted by the detection circuit. Such a speed measurement device is particularly reliable, and suited for use on board an aircraft for measuring the speed thereof relative to the surrounding air.

20 Claims, 2 Drawing Sheets

(56) References Cited

U.S. PATENT DOCUMENTS

2009/0044634 A1 2/2009 Weilguny et al.
2015/0366042 A1* 12/2015 Zaidi .................. H05H 1/2406
                                                        315/111.21

OTHER PUBLICATIONS

Matlis E H et al, "A.C. Plasma Anemometer for Hypersonic Mach Number Experiments", Instrumentation in Aerospace Simulation Facilities, 2005. ICIASF '05. 21st International Congress on Sendai, Japan Aug. 29-1, 2005, Piscataway, NJ, USA,IEEE,29 août 2005 (Aug. 29, 2005), p. 245-256, XP010872630. Abstract retrieved from https://ieeexplore.ieee.org/document/1569930.

G.-N. B. Dandaron et al, "Experimental study of a negative corona in atmospheric-pressure argon", Plasma Physics Reports,vol. 33, No. 3, Mar. 1, 2007 (Mar. 1, 2007), p. 243-248, XP055360638 https://doi.org/10.1134/S1063780X07030099. Abstract retrieved from https://link.springer.com/article/10.1134%2FS1063780X07030099.

Werner et al., "Applications of the corona discharge for measurements of density and velocity transients in air flow," Jun. 1953, 94 pages.

Deng et al., "Numerical studies of Trichel pulses in airflows," J. Phys. D: Appl. Phys., vol. 46, No. 42, Oct. 2013, 9 pages.

Deng et al., "Effect of humidity on negative corona Trichel pulses," Japanese Journal of Applied Physics, vol. 53, Jul. 3, 2014, 5 pages.

Van Brunt et al., "Stochastic porperties of Trichel-pulse corona: A non-Markovian random point process," Physical review A, vol. 42, No. 8, Oct. 15, 1990, 25 pages.

Lama et al., "Systematic study of the electrical characteristics of the "Trichel" current pulses from negative needle-to-plane coronas," Journal of Applied Physics, vol. 45, No. 1, Jan. 1974, pp. 103-113.

Napartovich et al., "A numerical simulation of Trichel-pulse formation in a negative corona," J. Phys. D: Appl. Phys., vol. 30, 1997, pp. 2726-2736.

* cited by examiner

DEVICE AND METHOD FOR MEASURING A GAS FLOW SPEED

BACKGROUND OF THE INVENTION

Field of the Invention

The present invention relates to a device and method for measuring a flow speed of a gas, in particular for aeronautic applications.

Description of the Related Art

There are already many methods for measuring the speed of a gas flow. In particular it is known to measure the speed of the gas flow by using a Pitot tube. Such probe comprises a stagnation pressure capture hole which is directed facing the flow and a static pressure capture hole which is arranged on a wall tangential to the flow. The difference between the stagnation pressure and the static pressure is then proportional to the square of the speed of the gas. However, the stagnation pressure capture hole is made up of a capillary tube which could be obstructed by ice or dust, or by a maintenance operation problem, because of this the reliability of Pitot tubes can be insufficient.

It is also known to measure the speed of a gas flow by using an ultrasonic pulse emission probe. The principle of measurement is based on a determination of an ultrasonic pulse transit time. But such probes are limited to speeds to be measured which are less than 100 m/s (meter per second).

It is also known to use a laser beam which passes through the gas flow. The speed of the flow can be evaluated from a Doppler shift of the back-scattered light or wavelength shift of an absorption line of a component of the gas. But such methods require a laser source, at least one optical window for outlet of the beam towards the flow and for collecting the returning light. Further, these optical methods are imprecise when the speed of the flow is small.

Additionally, ionic probes are also known for measuring the speed of the gas flow. In a first category of such probes, ions are generated in the flow and then collected downstream from the zone of the generation thereof. The flow speed can then be determined from the time between the release and the collection of the items, called ion flight time, in the case of generation of ions by pulses, or deduced from the value of the electrical current collected, in the case of a continuous or nearly continuous generation of ions. But the probes from this first category require placing an ion source into the gas flow, which can interfere with this flow whose velocity is to be measured.

Finally, ionic probes from a second category use fine tips which are polarized by a direct voltage, positive or negative, for generating ions in the gas flow. For some of these probes, a measurement electrode is positioned downstream in the flow in order to collect electrical charges corresponding to the ions generated. The value of the electrical current in the measurement electrode can then be connected to the speed of the flow. For other probes, the tip is polarized by a negative direct voltage in order to produce a negative corona discharge. In this case, a pulse current value from the corona discharge, or a corona discharge pulse frequency value, provides a measurement of the flow speed. Such ionic probes are described in the work "Applications of the corona discharge for measurements of density and velocity transients in air flow" by F. D. Werner and R. L. Geronime, 1953, pp. 53-142 and in U.S. Pat. No. 3,945,251 entitled "Trichel Pulse Corona gas velocity instrument," by E. T. Pierce. But such ionic probes with direct current electrical polarization have a large hysteresis, such that successive measurements are affected by a drift of the results, and it is then difficult to get a reliable value for the speed of the flow of the gas.

SUMMARY OF THE INVENTION

Starting from this situation, an object of the present invention is to propose a new probe for measuring the speed of a gas flow, which does not have the disadvantages of the prior probes reviewed above. In particular, the following properties are sought:

a measurement range, also called measurement dynamic, which is broad, possibly controllable, and allows measurement of flows at low speed and high speed;

the use of a capillary is avoided since it could be obstructed;

the use of optical windows is avoided since they could become dirty or opaque or diffusing;

there is no hysteresis during measurements which are carried out successively;

operation is compatible with an anti-icing or de-icing system for a probe which is used for the measurements; and it has a structure which electrically isolates a high-voltage sub-circuit from a low-voltage sub-circuit.

To reach at least one of these objects or others, a first aspect of the invention proposes a device for measurement of a speed of a gas flow, which comprises:

a rigid probe intended to be placed in the gas flow, where the probe comprises an axial electrode which has one exposed end intended to be in contact with the gas, where this exposed end has a radius of curvature suited to produce an electrical field strengthening through tip effect, and comprises a peripheral electrode which is electrically isolated from the axial electrode and which has an exposed part also intended to be in contact with the gas, located away from the axial electrode; and a voltage supply source, which has two output terminals which are electrically connected to the axial electrode for one of the output terminals and to the peripheral electrode for the other one of the output terminals.

In connection with the present invention, an electrode end having a radius of curvature suited to produce an electrical field strengthening through tip effect is understood to mean an electrode which has a radius of curvature less than 5 mm (millimeter), preferably less than 2 mm. The electrical effect called tip effect is very well known to the person skilled in the art, so much so that there is no need to describe it here. This effect is even greater when the radius of curvature of the end of the electrode which forms the tip is smaller. When this radius of curvature is sufficiently small, below 5 mm, preferably below 2 mm, a local electrical field is sufficiently increased by the tip geometry for reaching an ionization potential of the gas.

According to the invention, the power source produces a voltage which is alternating, meaning with periods of negative voltage values and periods of positive voltage values which alternate, and the device further comprises:

a detection circuit, comprising at least one conducting turn arranged around an electrical connection which connects one of the electrodes of the probe to one of the terminals of the supply source, or arranged around the axial electrode, and comprising a counter arranged for counting electrical pulses which are generated in the turn by induction, selectively during at least one time-window during which an electrical potential of the axial electrode is less than an electrical potential of the peripheral electrode.

Thus when the probe is supplied with alternating voltage by the supply source, a number of electrical pulses which are counted by the detection circuit, corresponding to a number of electrical discharges which appear between the axial electrode and the peripheral electrode through the gas, constitute a measurement of the speed of the flow of the gas.

Such a device has the following advantages:
- the use of an alternating voltage between the electrodes of the probe eliminates a possible hysteresis behavior;
- counting corona discharge pulses during periods when the axial electrode, which comprises the tip, is negatively polarized relative to the peripheral electrode, limits the measurement operation to a negative corona discharge regime, which generates regular current pulses unlike a positive corona discharge regime for which the axial electrode which comprises the tip would be positively polarized compared to the peripheral electrode;
- the measurement range is very broad. In particular, it is compatible with use onboard airplanes; and
- the detection of electrical discharge pulses by induction allows to electrically isolate a supply circuit, which produces the voltage to be applied between both electrodes of the probe, and the detection circuit.

This results in operating safety for the device for measurement of flow speed of the gas, and also for external electrical circuits.

In various implementations of a device according to the invention, the following configurations or improvements may be used, separately or in combination of several of them:
- the exposed part of the peripheral electrode may have an annular shape around an axis of symmetry of the exposed end of the axial electrode;
- the exposed part of the peripheral electrode may be recessed relative to the exposed end of the axial electrode, with a recessed direction which is opposite the exposed end of the axial electrode; and
- the device may further comprise a ballast resistance which is connected in series between one of the electrodes of the probe and the terminal of the supply source which is connected to that electrode. Such a ballast resistance may advantageously be arranged in the probe. In particular, the ballast resistance may be arranged in the probe around one rear end of the axial electrode, opposite from the exposed end thereof, and be in electrical contact with the peripheral surface of this rear end of the axial electrode. Such arrangement may be used to form an anti-icing or de-icing system for the probe. For example, when the ballast resistance is formed by a cylinder of electrically conducting material, the probe may further comprise an electrically conducting tube which is arranged and electrically connected to form a capacitor with the cylinder of the ballast resistance. Thus, an electrical current which flows in the capacitor when the probe is supplied by the supply source generates heat suitable for heating the axial electrode by Joule effect in the cylinder of the ballast resistance. For such structure of the probe, the conducting turn may further be arranged in the probe around a part of the axial electrode which is not covered by the cylinder of the ballast resistance while being isolated therefrom. Possibly, the electrical pulse signals which come from this turn may be amplified or transformed before being sent outside the probe, in order to ensure this transmission is reliable.

A second aspect of the invention proposes a method for measuring a speed of a gas flow which comprises the following steps:
/1/ providing a rigid probe comprising an axial electrode which has one exposed end with a radius of curvature suited to produce an electrical field strengthening through tip effect, and comprising a peripheral electrode which is electrically isolated from the axial electrode and which has an exposed part, located away from the axial electrode;
/2/ placing the probe in the gas flow, so that the exposed end of the axial electrode and the exposed part of the peripheral electrode are simultaneously in contact with the gas; and
/3/ applying an electrical voltage between the axial electrode and the peripheral electrode, so as to produce electrical discharges through the gas between the electrodes.

According to the invention, the voltage which is applied is an alternating voltage, and the method further comprises the following steps:
/4/ detecting and counting electrical pulses which are generated by induction in at least one conducting turn arranged around an electrical connection used for applying the alternating voltage to the electrodes, or arranged around the axial electrode, and which correspond to electrical discharges through the gas, selectively during at least one time-window during which an electrical potential of the axial electrode is less than an electrical potential of the peripheral electrode; and
/5/ deducing a value of the speed of the flow of the gas from a result of counting the electrical pulses.

Preferably, the gas from the flow comprises at least one compound which has a significant electronegativity, such as air for example, in order to obtain a negative coronal discharge which is more stable from the axial electrode during negative half-cycles of the supply voltage.

Preferably, the probe may be oriented relative to the gas flow so that the exposed end of the axial electrode is turned to an upstream direction of the flow and that an axis of symmetry of this exposed end of the axial electrode is parallel to the flow of gas.

Also preferably, the counting of electrical pulses may be continued over several successive time-windows, where each time-window is contained in a negative half-cycle of the electrical potential of the axial electrode relative to the electrical potential of the peripheral electrode, separately for each time-window.

Again preferably, an average time between two electrical pulses which are successive within a single time-window, or an average frequency of electrical pulses within a single time-window, may be calculated. Then, the value of the speed of the flow of the gas can be deduced from the average time or the average frequency.

Possibly, the calculation of the speed of the gas flow may result from a calibration phase and a measurement phase, referred to as useful measurement. In this case, the speed of the gas flow may be calculated by using the formula $U=U_1 \cdot (N_0-N)/(N_0-N_1)$, where $N_0$ is a first number of electrical pulses which are counted for a first calibration measurement which is performed while the speed of the gas flow is zero, $N_1$ is a second number of electrical pulses which are counted for a second calibration measurement performed when the speed of the gas flow is non-zero and equal to $U_1$, N is a third number of electrical pulses which are counted for the useful measurement, and U is the value of the speed of the gas flow during the useful measurement. To this purpose, the alternating voltage which is applied between the two electrodes of the probe is identical for both calibration measurements and for the useful measurement.

A method according to the second aspect of the invention may be implemented by using a device which is compliant with the first aspect. In particular, when this device comprises a ballast resistance in the probe and a tube for forming a capacitor with the balance resistance, a heating power which is dissipated in the ballast resistance may be adjusted by modifying a frequency or shape of the alternating voltage which is produced by the supply source. Thus, the supply source has two functions: production of the negative corona discharge, and also anti-icing or de-icing of the probe in order to avoid a layer of electrically insulating ice from covering the exposed end of the axial electrode.

Finally, a method conforming to the invention may be implemented on board an aircraft which is suited for moving relative to the air outside of this aircraft, forming the previously mentioned flowing gas. To this purpose, the probe is rigidly attached to the aircraft so as to be maintained in the airflow outside the aircraft. In such an application, the peripheral electrode of the probe may advantageously be electrically connected to a ground of the aircraft, such that an electrical potential of this peripheral electrode remains equal to an electrical potential of the ground of the aircraft.

BRIEF DESCRIPTION OF THE DRAWINGS

Other specifics and advantages of the present invention will appear in the following description of non-limiting implementation examples referring to the attached drawings, in which.

DESCRIPTION OF THE PREFERRED EMBODIMENTS

For reasons of clarity, the dimensions of the elements which are shown in these figures do not correspond either to actual dimensions or to actual ratios of dimensions. Further, identical references which are indicated in FIGS. 1 and 3 designate elements which are identical or which have identical functions.

In the present description, negative coronal discharge is understood to be an ionization of a gas in the vicinity of an electrode having a small radius of curvature when a negative voltage is applied to this electrode relative to a peripheral electrode. The electrical current pulses which result from such a negative corona discharge, when the gas is electronegative, such as air for example, are called Trichel pulses. Each pulse lasts several tens of nanoseconds, with an amplitude of several milliamperes, and with a frequency of repetition of the pulses of several tens of kilohertz. When a positive voltage is applied to the electrode with small radius of curvature, relative to the peripheral electrode, a positive corona discharge results whose properties are different.

Figures 1, 1A, 3:
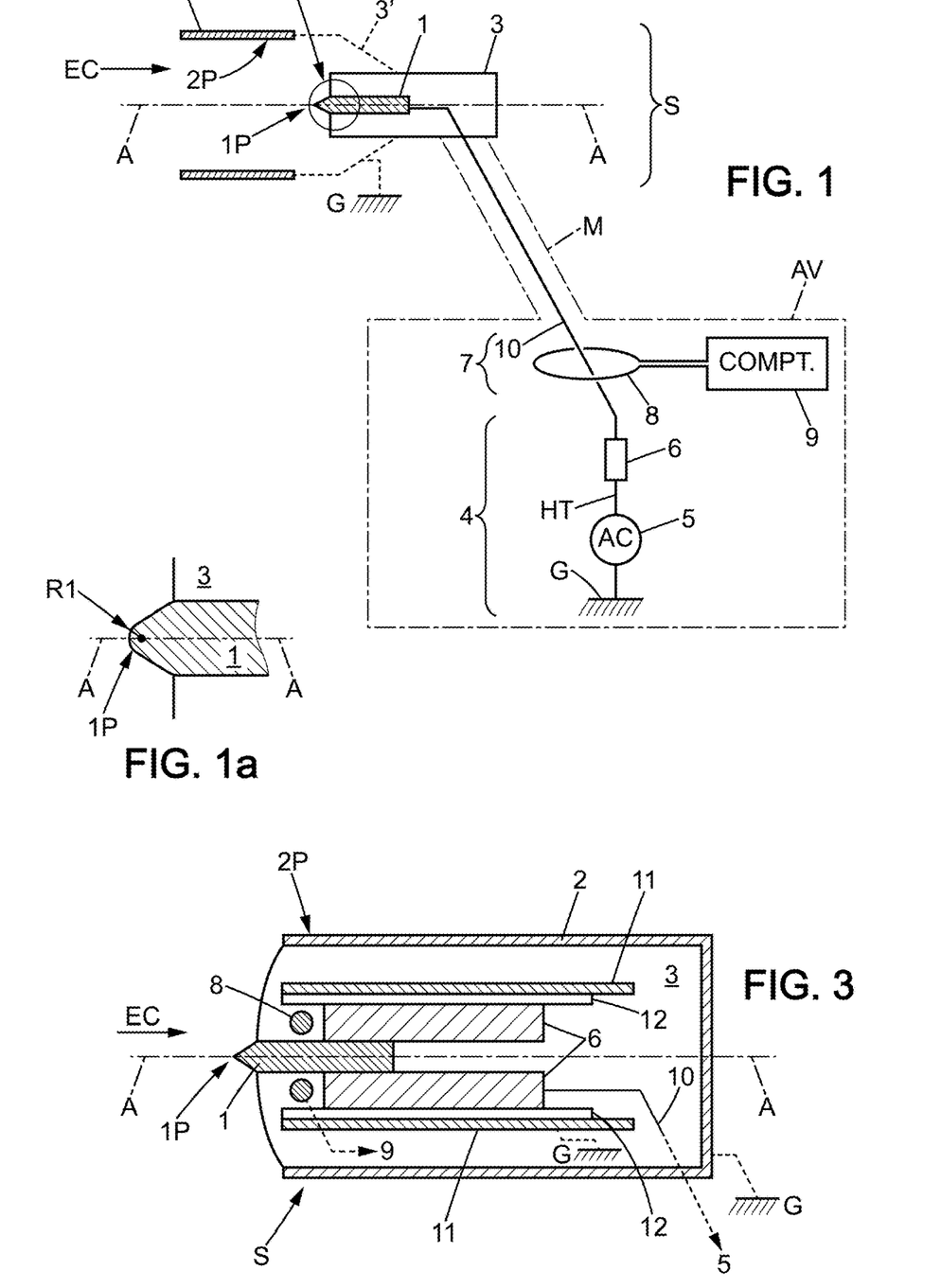
FIG. 1 is a schematic drawing of a measurement device according to the present invention.
FIG. 1a is an enlargement of a portion of FIG. 1.
FIG. 3 is a section view of a probe which complies with a preferred embodiment of the present invention.

As shown in FIG. 1, a probe S comprises an axial electrode 1 and a peripheral electrode 2. The axial electrode 1 has an axis of symmetry A-A and is housed in an envelope 3 which is electrically insulating. One end 1P of the axial electrode 1 is exposed outside the envelope 3 in order to be in contact with a gas outside the probe S. FIG. 1a shows an enlargement of the exposed end 1P of the axial electrode 1. This exposed end 1P has a tip shape parallel to the axis A-A, with a radius of curvature R1 which is less than 5 mm, preferably less than 2 mm. The axial electrode 1 is of an electrically conducting material, preferably an alloy which resists atomic abrasion and pulverizing when exposed to a plasma.

The peripheral electrode 2 may have an annular shape also having the axis A-A as axis of symmetry. It is arranged away from the axial electrode 1, in particular radially relative to the axis A-A. The peripheral electrode 2 is also made up of a material which is electrically conducting and has an exposed portion 2P which is intended to be in contact with the gas outside the probe S at the same time as the axial electrode 1. For the configuration of the probe S which is shown in FIG. 1, the peripheral electrode 2 can be kept in fixed position relative to the axial electrode 1 by at least one arm 3', which is designed for not disturbing, or disturbing the least possible, a flow EC of external gas around the probe S, possibly by allowing passage of the gas between the envelope 3 and the peripheral electrode 2. The arm 3' is also designed for electrically isolating the peripheral electrode 2 from the axial electrode 1, while also allowing electrical connection of the peripheral electrode 2 to an electrical supply terminal of the probe S, as explained below.

For example, the axial electrode 1 may be tungsten (W), molybdenum (Mo) or stainless steel, and the peripheral electrode may be out of stainless steel or an aluminum (Al) alloy.

A voltage can be applied between the axial electrode 1 and the peripheral electrode 2 with an electrical supply circuit 4. The supply circuit 4 includes a voltage supply source 5 and optionally a ballast resistance 6. The first output terminal from the supply source 5, labeled HT for high voltage, is connected to the axial electrode 1 and the second output terminal from the supply source 5, labeled G, is connected to the peripheral electrode 2. Preferably, the terminal G may be connected to a ground of the support AV for the probe S. In this case, the probe S can be rigidly attached to the support AV by means of a mast M, and the support AV can contain the electrical supply circuit 4. For such a configuration, an electrical connection 10 connects the axial electrode 1 to the terminal HT of the electrical supply source 5 through the mast M, and the peripheral electrode 2 is connected to the terminal G through the arm 3', the insulating envelope 3 and the mast M. For an aeronautic application, the support AV of the probe S may be an aircraft, for example an airplane, and the gas for the flow EC is the surrounding air around the airplane. The goal of the probe S is then to allow measurement of the speed of the airflow EC relative to the support AV. Preferably, the probe S is directed relative to the flow EC so that the axis A-A is parallel to the flow, with the exposed end 1P of the axial electrode 1 directed towards the upstream of the flow.

For example, the resistance of the ballast 6 may be comprised between 1 MΩ (megohm) and 100 MΩ, for example several tens of megohms.

In such system with two electrodes where the radius of curvature of one of the electrodes is smaller than that of the other electrode, the application of an electrical potential difference between the electrodes causes a concentration of the electrical field near the electrode which has the smaller radius of curvature. By increasing the absolute electrical potential difference between the two electrodes, the electrical field which is concentrated in front of the electrode with the smaller radius of curvature can exceed the breakdown threshold of the gas. An electrical discharge will then occur through the gas, during which an electronic avalanche ionizes the atoms and/or molecules of the gas and thus forms a plasma of positive charges, i.e. cations, and negative charges, i.e. principally electrons. The properties of this electrical discharge are determined by the nature of the gas, including the density, temperature and chemical composition thereof and the polarity of the voltage which is applied between the two electrodes.

When the gas is air, the topology and behavior the electrical discharge are very different depending on the polarity of the voltage which is applied. When the electrode with the smaller radius of curvature is positively polarized, a positive corona discharge is produced, in the form of plasma filaments which propagate from this electrode which has the smaller radius of curvature. These plasma filaments, which have random spatial and time distributions, produce electrical pulses in the closed supply circuit of the electrodes.

But, when the electrode with the smaller radius of curvature is negatively polarized relative to the other electrode, a negative corona discharge is produced, in the form of a regular or nearly regular series of Trichel electrical pulses. Each pulse corresponds to the formation of ionic species near the small radius of curvature electrode. The time distribution of these pulses is narrow and bounded by a maximum frequency. When the voltage which is applied between the two electrodes is below a lower threshold the pulses are irregular. When the applied voltage goes over an upper threshold, a regime of nearly continuous electrical discharge appears. Between these two thresholds, upper and lower, the frequency of electrical discharge pulses through the gas depends on the value of the voltage which is applied between the two electrodes, the gas—including the electronegativity value thereof and the humidity thereof—the speed of the gas flow EC, the electrode material at the radius of smallest curvature, the geometry thereof—including the radius of curvature thereof and the surface roughness thereof—and the ambient electrical field.

The formation of each electrical discharge pulse through the gas proceeds by electronic avalanche, initiated in the volume where the electrical field is maximal, meaning near the electrode having the smallest radius of curvature. Such avalanche starts by the formation of electron initiation sites near the tip of the electrode by field-effect emission or by secondary emission which is triggered by the impact of the cations on the electrode. In a negative corona discharge, these electrons are repelled from the electrode tip by the electrical field emanating therefrom. At the same time, they are accelerated and collide with gas atoms or molecules. A portion of these electrons which have sufficient energy go on to produce ionizing collisions which each create an additional electron and an additional cation. An exponential multiplication of the number of electrons, called an avalanche, is thus produced as the electrons move away from the electrode with small radius of curvature. This avalanche next stops because of two phenomena. As the cloud of electrons moves away from the electrode with small radius of curvature, the electrical field created by this electrode decreases, consequently reducing the energy of the electrons at the moment of new collisions. Additionally, the formation of free electrical charges in the gas produces an electrostatic screen which attenuates the electrical field created by the electrode with small radius of curvature. The electrical field which these electrons are subject is thus going to become too weak, and the electrons are going to bind to gas atoms or molecules, in particular molecular oxygen ($O_2$) in the case of air, for forming anions. Thus, the formation of a new avalanche, and therefore a new electrical discharge pulse, is only possible again after the cations and anions produced by the preceding electrical discharge have been collected by the two electrodes because of a residual part of the electrical field. It is then known, in particular from the document "Numerical studies of Trichel pulses in airflows," by F. C. Deng, L. Y. Ye and K. C. Song, J. Phys. D. Appl. Phys., vol. 46, no. 42, p. 425,202, October 2013, that the flow EC of the gas changes the time which is needed for such a collection of ions, and therefore consequently changes the frequency of repetition of the avalanches, meaning the frequency of the electrical discharges which appear between the two electrodes.

Also, it is known that variations in the instantaneous voltage which exists between the two electrodes, variations of the electrical current induced in the electrodes and variations of the speed of the flow EC can cause hysteresis in the average electrical discharge current.

Considering these observations, the present invention proposes to use:
  an alternating voltage for polarizing the two electrodes relative to each other in order to suppress possible hysteresis, which could disturb the measurements, with the regular inversion of the sign of this voltage; and
  limiting measurements to within periods when the electrode with the smaller radius of curvature is negatively polarized relative to the other electrode, in order to benefit from the better regularity of a negative corona discharge compared to a positive corona discharge.

Under these conditions, electrical current pulses appear in the electrical supply circuit 4, and therefore in the axial electrode 1 and the electrical connection 10, with a pulse frequency or an average time between two successive pulses which depends on the speed of the flow EC. More specifically, the duration between two successive pulses increases when the speed of the flow EC becomes larger, if the exposed tip 1P of the axial electrode 1 is oriented towards the upstream of the flow EC.

According to an additional feature of the invention, such pulses are detected by induction, so as to avoid a continuity of electrical path connecting the electrical supply circuit 4 to a circuit which is used for detecting the negative corona discharge current. Such a detection circuit 7 comprises at least one conducting turn 8 or possibly several turns in the form of a detection coil, which surrounds the electrical connection 10 and is connected to a pulse counter 9 labeled COMPT. It is thus possible to count the electrical pulses which are induced in the turn 8 by induction by the electrical discharge pulses which pass in the electrical connection 10. For example, the turn 8 may be implemented in the form of a Rogowski coil, known to the person skilled in the art.

In order to benefit from the advantages which were previously given for a polarization voltage of the electrodes which is alternating, and those of the negative corona discharge, the detection and counting of pulses are limited according to the invention to within the time-windows FN during which the electrical potential of the axial electrode 1 is less than that of the peripheral electrode 2. To this end, the time-windows FN are contained in time periods where the voltage which is delivered by the source 5 is negative. In the jargon of the person skilled in the art, these time periods are called negative half-cycles of the alternating voltage.

Figure 2A:
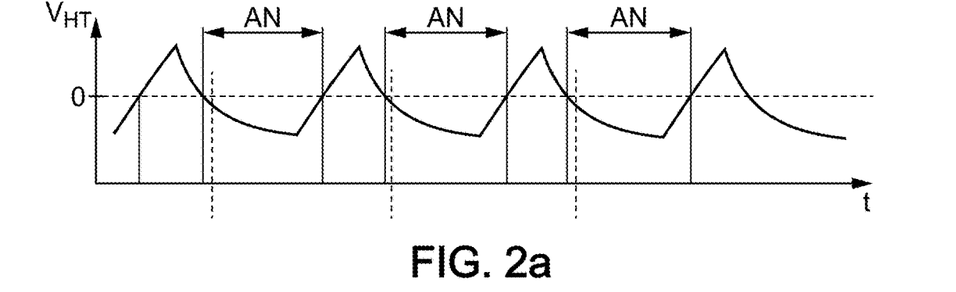
FIGS. 2a-2d are a series of time-diagrams to be read in combination which illustrate operation of a measurement device according to the invention.

FIG. 2a shows variations of the electrical voltage, labeled $V_{HT}$, which is delivered by the source 5 as a function of time, labeled t. Preferably, these variations may be periodic, but may have an arbitrary form. The peak value of the voltage $V_{HT}$ may be comprised between 1 kV (kilovolt) and 20 kV, and the frequency thereof may be of order a few hundred hertz when the gas of the flow EC is air. AN designates negative half-cycles of the voltage $V_{HT}$.

Figure 2B:
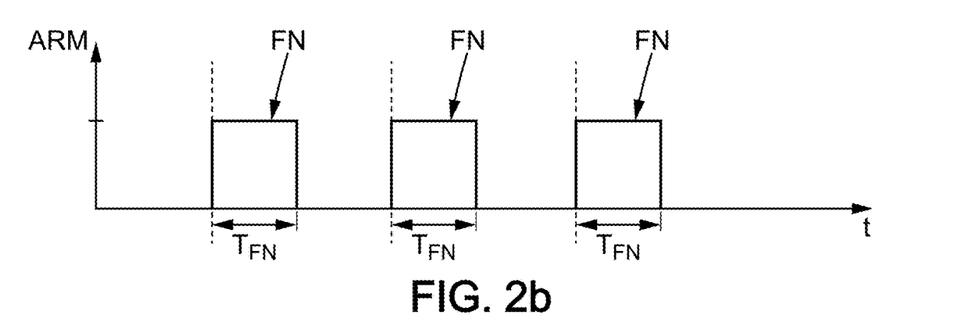

FIG. 2b shows a possible signal for activation of counting of pulses which are detected by the circuit 7. This activation signal, labeled ARM, authorizes counting of pulses within time-windows FN, which are those contained in the negative half-cycle AN of the voltage $V_{HT}$. $T_{FN}$ designates the duration of each time-window FN.

During each positive half-cycle of the voltage $V_{HT}$, the residual negative and positive charges which are present in front of the end 1P of the axial electrode 1 are neutralized. In this way, a new pulse counting window FN can be started without initial parasitic charge.

Figure 2C:
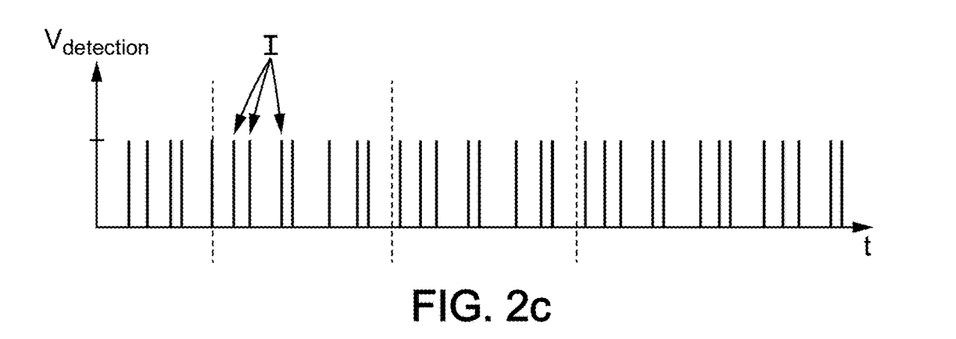

FIG. 2c is an example of time-distribution of electrical pulses which are detected by the circuit 7, labeled I. These pulses I are produced both during the positive half-cycles and also during the negative half-cycles of the voltage, but only those in the negative half-cycles are sufficiently regular to obtain a reliable measurement of the speed of the flow EC. FIG. 2c represents for example the absolute value of the voltage which exists between the ends of the conducting turn 8, and which is labeled $V_{detection}$.

Figure 2D:
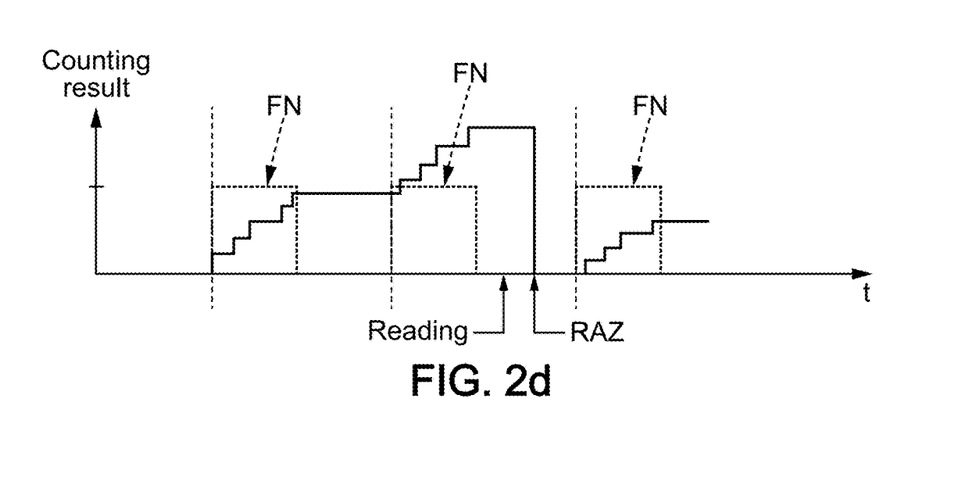

Finally, FIG. 2d shows the progression of a result of counting pulses I, when the counting is performed continuously during two successive negative half-cycles of the voltage $V_{HT}$. The counting result is read after the end of the last time-window FN of the counting time, and then a counting reset, labeled RAZ, is applied before beginning a new time-window FN for a new counting of pulses.

Phenomenologically, the average time T between two successive pulses which are detected is an increasing function of the speed U of the flow EC, when the probe S is directed towards the upstream of the flow EC as shown in FIG. 1, according to the following relationship: $T=\alpha/(\beta \cdot V_{HT}-U)=T_{FN}/N$, where $\alpha$ and $\beta$ are two positive constants which depend on the geometry of the electrodes 1 and 2, the gas and the possible inclination of the probe S relative to the flow EC, and where $T_{FN}$ is again the duration of a time-window FN, and N is the number of pulses I which are counted during one time-window FN. To get more precise results, it is possible to count the pulses I continuously during several successive time-windows FN, as shown in FIG. 2d, and then divide the counting result by the number of time-windows FN of the total count.

Generally for the invention, when such a phenomenological relationship is used, the constants $\alpha$ and $\beta$ can be determined by using a calibration sequence with the same gas as that for the useful measurements, the same orientation of the probe S relative to the flow EC during the calibration sequence as for the useful measurement, and the same alternating voltage V produced by the source 5. Such a calibration system may include the following two measurements:

during a first calibration measurement, the speed of the flow EC is zero (U=0), and the number of pulses counted is $N_0$. Then, $\alpha/(\beta \cdot V_{HT})=T_{FN}/N_0$, and next during a second calibration measurement, the speed of the flow EC is non-zero, known and equal to $U_1$, and the number of pulses counted is $N_1$. Then, $\alpha/(\beta \cdot V_{HT}-U_1)=T_{FN}/N_1$.

Consequently, for a useful measurement, the speed U of the flow EC is given by the relationship: $U=U_1 \cdot (N_0-N)/(N_0-N_1)$, where N is the number of pulses I which are counted for the useful measurement. The calibration sequences can be performed once initially, or be repeated several times between successive useful measurements when the speed U can be known by using other methods. Such other methods may be, for example GPS measurements or an onboard sensor which is a of a different type when the support AV is an aircraft, in particular a Pitot tube type probe.

The measurement dynamic of a device according to the invention may be controlled by the amplitude of the alternating voltage $V_{HT}$ which is applied between the electrodes 1 and 2. Indeed, this dynamic is controlled by the average number of pulses I in each time-window FN, which itself is an increasing function of the alternating voltage $V_{HT}$. It is thus possible to get a good sensitivity for small values of the speed U of the flow EC, for example of order of ten of meters per second, and also for high values of the speed U, for example of order several hundreds of meters per second.

An additional advantage of the invention results from the digital nature of the acquired measurement signal, unlike an analog measurement which may be sensitive to electromagnetic disturbances.

FIG. 3 shows an alternate implementation of the speed measurement device according to the invention. In this implementation, the peripheral electrode 2 is arranged on the outer surface of the insulating envelope 3, being recessed towards the downstream of the flow EC of the gas relative to the end 1P of the axial electrode 1.

The ballast resistance 6 can be housed in the probe S, and formed from a cylinder of low electrical conductivity material, which surrounds a posterior part of the axial electrode 1, opposite the exposed end 1P thereof. This cylinder may be in electrical contact with the rear portion of the axial electrode 1, and may itself be connected by the rear end thereof to the electrical connection 10 coming from the source 5. Advantageously, a tube 11 of electrically conducting material may be arranged around the cylinder of the ballast resistance 6, with a layer 12 of electrically insulating material which is intermediate between the cylinder of the ballast resistance 6 and the tube 11. The tube 11 is then electrically connected to ground G. In this way, the cylinder of the ballast resistance 6 and the tube 11 form a cylindrical capacitor. The electrical current which flows in the cylinder of the ballast resistance 6 and in this capacitor when the probe S is powered with alternating voltage by the source 5 produces heat within the cylinder of the ballast resistance 6 by resistive heating. If the electrically insulating material of the envelope 3 is also thermally insulating, the configuration of the probe S concentrates the heat which is produced in the cylinder of the ballast resistance 6 onto the axial electrode 1. Such heating may be used to ensure that ice does not form on the exposed end 1B of the axial electrode 1, or to melt the ice. The heating power of the axial electrode 1 may then be adjusted by changing the frequency or shape of the time-variations of the alternating voltage, in particular by changing the slope of the rising edges of this alternating voltage without changing the duration of the time-windows FN which are dedicated to counting pulses I. Indeed, the current which passes through the capacitor formed by the ballast resistance 6 cylinder and by the tube 11 can be modified in that way for changing the heating power the axial electrode 1. Such a mode for heating the axial electrode 1 is independent of the existence and average strength of the electrical discharge current which passes in the electrode 1, through the gas, and in the electrode 2. For example, the material of the cylinder of ballast resistance 6 may be a conducting resin or graphite (C), and the tube 11 may be an aluminum (Al) alloy or conducting metal. The intermediate layer 12 may be of a polymer, such as polytetrafluoroethylene (PTFE), Mylar®, Kapton® or of an insulating ceramic whose breakdown voltage is greater than the maximum absolute value of the voltage $V_{HT}$, and the envelope 3 may be of polymer or ceramic.

The turn 8 of the detection circuit 7 may be arranged around the axial electrode 1, inside the envelope 3 between the exposed end 1P of the axial electrode 1 and the front end of the cylinder of the ballast resistance 6. Thanks to such an arrangement, the detection of electrical discharge pulses through the gas is not disturbed by the current which could be used to heat the axial electrode 1.

An advantage of such embodiment is the compactness thereof. Indeed, the probe S may be shaped as a cylinder of about 1 cm in diameter and a few centimeters long.

It is understood that the invention can be reproduced by changing secondary aspects thereof relative to the embodiments which were described in detail above. In particular, the pulse counter of the detection circuit may be implemented in several ways, by incorporating an integrator or not. Further, recall that the alternating voltage which is applied between the two electrodes is not necessarily sinusoidal.

The invention claimed is:

1. A device for measurement of a speed of a gas flow, comprising:
   a rigid probe (S) intended to be placed in the gas flow (EC), where the probe comprises an axial electrode (1) which has one exposed end (1P) intended to be in contact with the gas, where this exposed end has a radius of curvature (R1) suited to produce an electrical field strengthening through tip effect, and comprises a peripheral electrode (2) which is electrically isolated from the axial electrode and which has an exposed part (2P) also intended to be in contact with the gas, located away from the axial electrode; and
   a voltage supply source (5), having two output terminals (HT, G) which are electrically connected to the axial electrode (1) for one of said output terminals and to the peripheral electrode (2) for the other one of said output terminals,
wherein the supply source (5) produces an alternating voltage (AC), and wherein the device further comprises:
   a detection circuit (7), comprising at least one conducting turn (8) arranged around an electrical connection (10) which connects one of the electrodes (1, 2) of the probe (S) to one of the terminals of the supply source (5), or arranged around the axial electrode (1), and comprising a counter (9) arranged for counting electrical pulses (I) which are generated in the turn by induction, selectively during at least one time-window (FN) during which an electrical potential of the axial electrode (1) is less than an electrical potential of the peripheral electrode (2),
whereby when the probe (S) is supplied with alternating voltage (AC) by the supply source (5), a number of electrical pulses (I) which are counted by the detection circuit (7), corresponding to a number of electrical discharges which have appeared between the axial electrode (1) and the peripheral electrode (2) through the gas, constitute a measurement of the speed of the flow (EC) of the gas.

2. The device according to claim 1, wherein the exposed part (2P) of the peripheral electrode (2) has an annular shape around an axis of symmetry (A-A) of the exposed end (1P) of the axial electrode (1).

3. The device according to claim 2, wherein the exposed part (2P) of the peripheral electrode (2) is recessed relative to the exposed end (1P) of the axial electrode (1), with a recessed direction which is opposite to the exposed end of the axial electrode.

4. The device according to claim 2, further comprising a ballast resistance (6) connected in series between one of the electrodes (1, 2) of the probe (S) and the terminal of the supply source (5) which is connected to said electrode, and the ballast resistance is arranged in the probe.

5. The device according to claim 1, wherein the exposed part (2P) of the peripheral electrode (2) is recessed relative to the exposed end (1P) of the axial electrode (1), with a recessed direction which is opposite to the exposed end of the axial electrode.

6. The device according to claim 5, further comprising a ballast resistance (6) connected in series between one of the electrodes (1, 2) of the probe (S) and the terminal of the supply source (5) which is connected to said electrode, and the ballast resistance is arranged in the probe.

7. The device according to claim 1, further comprising a ballast resistance (6) connected in series between one of the electrodes (1, 2) of the probe (S) and the terminal of the supply source (5) which is connected to said electrode, and the ballast resistance is arranged in the probe.

8. The device according to claim 7, wherein the ballast resistance (6) is arranged in the probe (S) around one rear end of the axial electrode (1), opposite the exposed end (1P) of said axial electrode, and is in electrical contact with a peripheral surface of said rear end of the axial electrode.

9. The device according to claim 8, wherein the ballast resistance (6) is formed by a cylinder of electrically conducting material, and the probe (S) further comprises an electrically conducting tube (11) which is arranged and electrically connected to form a capacitor with the cylinder of the ballast resistance, so that an electrical current which flows in the capacitor when the probe is supplied by the supply source (5) generates heat suitable for heating the axial electrode (1) by Joule effect in the cylinder of the ballast resistance.

10. The device according to claim 9, wherein the conducting turn (8) is arranged in the probe (S) around a part of the axial electrode (1) which is not covered by the cylinder of the ballast resistance (6), while being electrically isolated from said axial electrode.

11. A method for measurement of a speed of a gas flow (EC), comprising:
   providing a rigid probe (S) comprising an axial electrode (1) which has one exposed end (1P) with a radius of curvature (R1) suited to produce an electrical field strengthening through tip effect, and comprising a peripheral electrode (2) which is electrically isolated from the axial electrode and which has an exposed part (2P), located away from the axial electrode;
   placing the probe (S) in the gas flow (EC), so that the exposed end (1P) of the axial electrode (1) and the exposed part (2P) of the peripheral electrode (2) are simultaneously in contact with the gas; and
   applying an electrical voltage between the axial electrode (1) and the peripheral electrode (2), so as to produce electrical discharges through the gas between said electrodes;

wherein the electrical voltage which is applied is an alternating voltage (AC), and wherein the method further comprises the following steps:

detecting and counting electrical pulses (I) which are generated by induction in at least one conducting turn (8) arranged around an electrical connection (10) used for applying the alternating voltage (AC) to the electrodes (1, 2), or arranged around the axial electrode (1), and which correspond to electrical discharges through the gas, selectively during at least one time-window (FN) during which an electrical potential of the axial electrode (1) is less than an electrical potential of the peripheral electrode (2); and     deducing a value of the speed of the flow (EC) of the gas from a result of counting the electrical pulses (I),     wherein the method is implemented by using a device which is in accordance with claim 6, and wherein a heating power which is dissipated in the ballast resistance (6) is adjusted by modifying a frequency or shape of the alternating voltage (AC) which is produced by the supply source (5).

12. A method for measurement of a speed of a gas flow (EC), comprising:

/1/providing a rigid probe (S) comprising an axial electrode (1) which has one exposed end (1P) with a radius of curvature (R1) suited to produce an electrical field strengthening through tip effect, and comprising a peripheral electrode (2) which is electrically isolated from the axial electrode and which has an exposed part (2P), located away from the axial electrode;

/2/placing the probe (S) in the gas flow (EC), so that the exposed end (1P) of the axial electrode (1) and the exposed part (2P) of the peripheral electrode (2) are simultaneously in contact with the gas; and     /3/applying an electrical voltage between the axial electrode (1) and the peripheral electrode (2), so as to produce electrical discharges through the gas between said electrodes;

wherein the electrical voltage which is applied is an alternating voltage (AC), and wherein the method further comprises the following steps:

/4/detecting and counting electrical pulses (I) which are generated by induction in at least one conducting turn (8) arranged around an electrical connection (10) used for applying the alternating voltage (AC) to the electrodes (1, 2), or arranged around the axial electrode (1), and which correspond to electrical discharges through the gas, selectively during at least one time-window (FN) during which an electrical potential of the axial electrode (1) is less than an electrical potential of the peripheral electrode (2); and     /5/deducing a value of the speed of the flow (EC) of the gas from a result of counting the electrical pulses (I).

13. The method according to claim 12, wherein the probe (S) is oriented relative to the gas flow (EC) so that the exposed end (1P) of the axial electrode (1) is turned to an upstream direction of the flow and that an axis of symmetry (A-A) of said exposed end (1P) of the axial electrode (1) is parallel to said flow of gas.

14. The method according to claim 13, wherein the counting of the electrical pulses (I) is continued over several successive time-windows (FN), where each time-window is contained in a negative half-cycle (AN) of the electrical potential of the axial electrode (1) relative to the electrical potential of the peripheral electrode (2), separately from each other time-window.

15. The method according to claim 13, wherein an average time between two electrical pulses (I) which are successive within a single time-window (FN), or an average frequency of the electrical pulses within a single time-window, is calculated, and the value of the speed of the flow (EC) of the gas is deduced from the average time or the average frequency.

16. The method according to claim 12, wherein the counting of the electrical pulses (I) is continued over several successive time-windows (FN), where each time-window is contained in a negative half-cycle (AN) of the electrical potential of the axial electrode (1) relative to the electrical potential of the peripheral electrode (2), separately from each other time-window.

17. The method according to claim 12, wherein an average time between two electrical pulses (I) which are successive within a single time-window (FN), or an average frequency of the electrical pulses within a single time-window, is calculated, and the value of the speed of the flow (EC) of the gas is deduced from the average time or the average frequency.

18. The method according to claim 12, wherein the speed of the gas flow (EC) is calculated by using the formula $U=U_1 \cdot (N_0-N)/(N_0-N_1)$, where $N_0$ is a first number of electrical pulses (I) counted for a first calibration measurement performed while the speed of the gas flow is zero, $N_1$ is a second number of electrical pulses counted for a second calibration measurement performed when the speed of the gas flow is non-zero and equal to $U_1$, N is a third number of electrical pulses counted for a useful measurement, and U is the value of the speed of the gas flow during the useful measurement, where the alternating voltage (AC) applied between the two electrodes (1, 2) of the probe (S) is identical for both calibration measurements and for the useful measurement.

19. The method according to claim 12, implemented on board an aircraft (AV) which is suited for moving relative to air outside of said aircraft, where the probe (S) is rigidly attached to the aircraft so as to be maintained in the airflow (EC) outside the aircraft.

20. The method according to claim 19, wherein the peripheral electrode (2) of the probe (S) is electrically connected to a ground (G) of the aircraft (AV), such that an electrical potential of said peripheral electrode remains equal to an electrical potential of the ground of the aircraft.

\* \* \* \* \*